United States Patent [19]
Yamamoto

[11] 3,828,608
[45] Aug. 13, 1974

[54] METHOD OF HYDRAULICALLY TESTING LOW TEMPERATURE LIQUEFIED GAS TANK OF A MEMBRANE TYPE

[75] Inventor: Katsuro Yamamoto, Tokyo, Japan

[73] Assignee: Bridgestone Liquefied Gas Company, Ltd., Tokyo, Japan

[22] Filed: Oct. 17, 1972

[21] Appl. No.: 298,407

[30] Foreign Application Priority Data
Dec. 20, 1971 Japan.............................. 47-83791

[52] U.S. Cl.................. 73/37, 73/49.2, 220/9 LG, 220/85 B
[51] Int. Cl............................................. G01m 3/02
[58] Field of Search........ 73/37, 49.2, 40; 220/85 B, 220/9 LG

[56] References Cited
UNITED STATES PATENTS
3,075,576  1/1963  Herbert............................ 220/85 B
3,534,884  10/1970  Suter................................ 220/85 B
FOREIGN PATENTS OR APPLICATIONS
924,803  5/1963  Great Britain.................... 220/9 LG Primary Examiner—Donald O. Woodiel
Attorney, Agent, or Firm—Stewart and Kolasch, Ltd.

[57] ABSTRACT

A method of hydraulically testing low temperature liquefied gas tanks of a membrane type, said tank comprising a rigid outer vessel, a heat insulating intermediate layer and an inner membranous vessel, wherein said inner membranous vessel is of an angular shape including substantially flat portions and curved edge and corner portions and is adapted to be smoothly supported by the inside surface of the heat insulating intermediate layer under contraction due to low temperature as well as expansion by internal pressure when the inner vessel is loaded with low temperature liquefied gases, though the inner vessel is formed as over-sized at atmospheric temperature than a space defined by the inside surface of the heat insulating layer in consideration of said contraction, the method being characterized by positively supporting said flat portions of the inner vessel in an expanded condition when the inner vessel is filled with water at atmospheric temperature so that no wrinkling due to margins for said contraction is formed at the time of hydraulic test executed at atmospheric temperaure.

3 Claims, 7 Drawing Figures 3,828,608

METHOD OF HYDRAULICALLY TESTING LOW TEMPERATURE LIQUEFIED GAS TANK OF A MEMBRANE TYPE

BACKGROUND OF THE INVENTION

1. Field of the Invention

This invention relates to a method of hydraulically testing low temperature liquefied gas tanks, and more particularly a method of hydraulically testing low temperature liquefied gas tanks of a membrane type composed of a rigid outer vessel, a heat insulating intermediate layer, and an inner membranous vessel, said inner vessel being provided over and adapted to be supported by the inside surface of the heat insulating intermediate layer, wherein the inner vessel is so formed as oversized than a space defined by the inside surface of the heat insulating intermediate layer in consideration of a contraction of the inner vessel at low temperature operating condition.

2. Description of the Prior Art

In the tanks of the abovementioned kind, the inner membranous vessel is so formed as over-sized at atmospheric temperature to compensate a contraction of the inner vessel at low temperature operating condition filled with low temperature liquefied gases. Therefore, when such an inner membranous vessel is mounted in the space defined by the heat insulating intermediate layer at atmospheric temperature, some portions, especially central portions of the inner membranous vessel are irregularly raised from the inside surface of the heat insulating intermediate layer. Such raised portions disappear of course when the inner vessel has been loaded with low temperature liquefied gases, wherein the inner membranous vessel contracts due to low temperature and follows closely to the inside surface of the heat insulating layer under the internal pressure applied by the liquefied gases loaded therein.

The tank of this kind must be inspected or tested of its fluid-tightness as well as its strength by a hydraulic test prior to the actual operation thereof. In this case, when the inner vessel is filled with water at atmospheric temperature for the purpose of hydraulic test, the abovementioned raised portions of the inner membranous vessel are pressed onto the inside surface of the heat insulating layer and the margins for contraction form steeply curved wrinkles under the hydraulic pressure applied from the inside of the inner vessel. If such steeply curved wrinkles are formed, the thin plate forming the inner membranous vessel is plastically deformed and there is a danger that the inner membranous vessel is broken at such wrinkled portions.

SUMMARY OF THE INVENTION

Accordingly, it is a main object of this invention to provide a method of hydraulically testing low temperature liquefied gas tanks of a membrane type wherein the formation of the abovementioned steeply curved wrinkles is effectively avoided.

Another object of this invention is to provide a method of hydraulically testing low temperature liquefied gas tanks of a membrane type by supporting the portions of the inner membranous vessel raised from the inside surface of the heat insulating intermediate layer at atmospheric temperature by elastic pads.

A further object of this invention is to provide a method of hydraulically testing low temperature liquefied gas tanks of a membrane type by previously expanding flat wall portions of the inner membranous vessel by pad plates so that the margins for contraction are shifted to edge and/or corner portions of the vessel.

A still further object of this invention is to provide a method of hydraulically testing low temperature liquefied gas tanks of a membrane type by provisionally constructing the oversized inner membranous vessel in the tank so that the margins for contraction are concentrated at edge and/or corner portions thereof until a hydraulic test is finished.

BRIEF DESCRIPTION OF THE DRAWING

In the accompanying drawing.

DESCRIPTION OF THE PREFERRED EMBODIMENTS

This invention is now described more particularly of some preferred embodiments with reference to the accompanying drawing.

Figure 1:
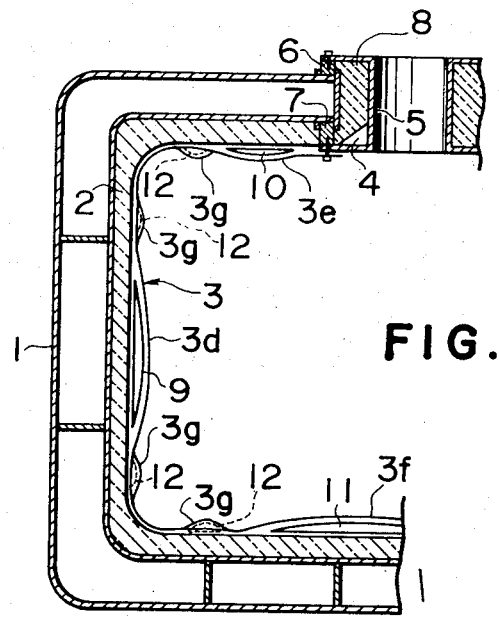
FIG. 1 shows a vertical section of a low temperature liquefied gas tank of a membrane type prepared for conducting a hydraulic test according to an embodiment of this invention.

Referring first to FIG. 1, there is shown in a vertical section a substantial part of a low temperature liquefied gas tank of a membrane type constructed as a tank of a tanker ship. In this case, the rigid outer vessel of the tank is formed as a dual-walled hull 1 lined with a heat insulating layer 2 made of compression resisting and heat insulating material such as hard foamed polyurethane, and over the inside surface of the heat insulating layer, there is provided an inner vessel 3 made of a thin plate of low temperature resisting material such as nickel steel, stainless steel, aluminium, etc.

Figure 2:
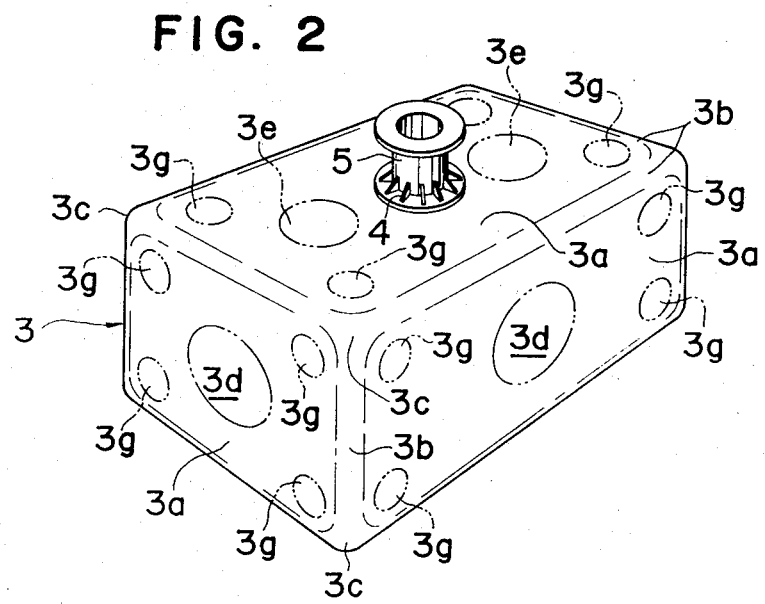
FIG. 2 shows the inner membranous vessel incorporated in the tank shown in FIG. 1, especially its convex and concave conditions, in a perspective view.

As shown in FIG. 2, the inner vessel 3 is formed to have substantially flat surfaces 3a, edge portions 3b of circular cross section and spherical corner portions 3c at atmospheric temperature unrestricted condition. However, when the inner vessel is mounted in the space defined by the heat insulating layer 2 at atmospheric temperature, the inner vessel 3 is formed with inwardly bulged portions 3d, 3e, and 3f (FIG. 1) in substantial regions of the flat portions 3a as well as inwardly bulged portions 3g in corner regions of the flat portions 3a due to the provision of margins for contraction at low temperature operating condition.

At a central portion of the roof of the inner vessel 3, there is provided a rigid trunk 5 reinforced by brackets 4 and the lower flange of the trunk is gas-tightly connected with the thin plate forming the inner vessel. Furthermore, the upper and the lower flanges of the trunk 5 are firmly connected with the dual-walled hull 1 via blocks 6 and 7 made of heat insulating material. The space left between the dual-walled hull 1 and the trunk 5 is filled with a proper heat insulating material 8 to protect the hull from being affected by the chill residing in the inner vessel.

Since the central portion of the roof of the inner vessel 3 is firmly connected to the trunk 5 firmly mounted to the hull, the inwardly bulged portions 3e in the roof portion of the inner vessel are formed at least at two portions, but in the side walls and the bottom of the inner vessel, the inwardly bulged portions 3d and 3f may be formed only at one portion thereof.

When the inner vessel 3 showing the inwardly bulged portions 3d, 3e, 3f and 3g at atmospheric temperature unloaded condition is loaded with low temperature liquefied gases, the inner vessel contracts to gather toward the trunk, while the inner vessel is expanded by the hydraulic pressure of the liquefied gasses and thus the inwardly bulged portions 3d, 3e, 3f and 3g disappear and all portions of the inner vessel come to close contact with the inside surface of the heat insulating layer 2. Then, the internal pressure of the inner vessel is supported by the hull by way of the heat insulating layer, while the inner vessel is kept substantially free of load.

However, at the time of hydraulic test by water at atmospheric temperature there occurs no contraction of the inner vessel 3, and therefore, the inwardly bulged portions 3d, 3e, 3f and 3g do not disappear. Therefore, when hydraulic pressure is applied to such inwardly bulged portions which are raised from the inside surface of the heat insulating layer, the inwardly bulged portions are deformed to steeply curved wrinkles and there is a danger that the thin plate forming the inner membranous vessel is broken at such wrinkled portions.

To avoid such a danger, according to a first embodiment of this invention, elastic pads, such as air bladders 9, 10, 11 and 12 are inserted in the space formed between the inwardly bulged portions 3d, 3e, 3f and 3g and the inside surface of the heat insulating layer 2 prior to the execution of hydraulic test.

By these elastic pads, the inwardly bulged portions are supported against the hydraulic pressure in the hydraulic test so as to hold their gradually inwardly bulged form, and thus the wrinkling of the inner vessel is effectively avoided. If the pads are rigid or almost rigid, there is still a danger that there is formed a steeply curved portion at the edges of the pads. Therefore, it is preferable that the pads are of an elastic nature.

After the hydraulic test has been finished, the heat insulating layer 2 may be partly bored at the portions corresponding to the inwardly bulged portions 3d, 3e, 3f and 3g of the inner vessel, and the pads or air bladders, which are now exhausted of air, are taken out through the bored openings. Or if the air bladders are made of a relatively thin membrane, the bladders exhausted of air can be left as they are without being any substantial obstacle in the subsequent operation.

Figure 3:
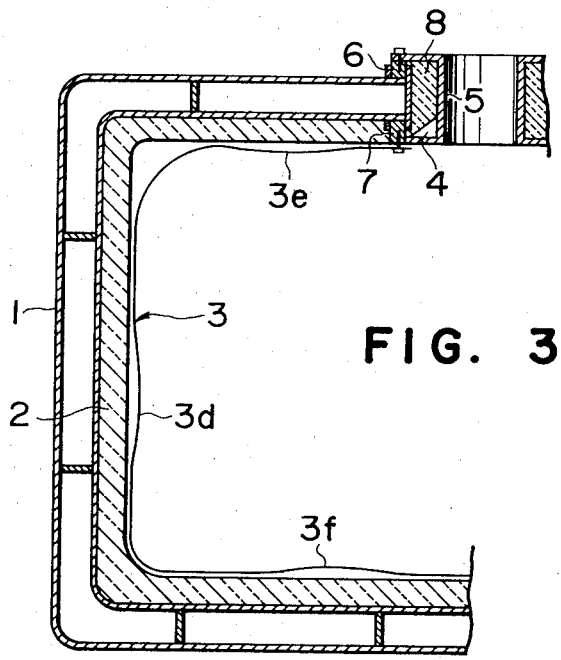
FIG. 3 shows a vertical section of another low temperature liquefied gas tank of a membrane type, for which a hydraulic test according to another embodiment of this invention is to be applied.

In case of a low temperature liquefied gas tank of a membrane type such as shown in FIG. 3, wherein the inner membranous vessel is not directly supported by the heat insulating layer at the edge and/or corner portions defined by adjacent side walls or a side wall and roof but is supported at such edge and/or corner portions in the manner of suspension by hoop tension, the abovementioned harmful wrinkling of the inner vessel is avoided by a second embodiment of this invention as described below.

Figure 4:
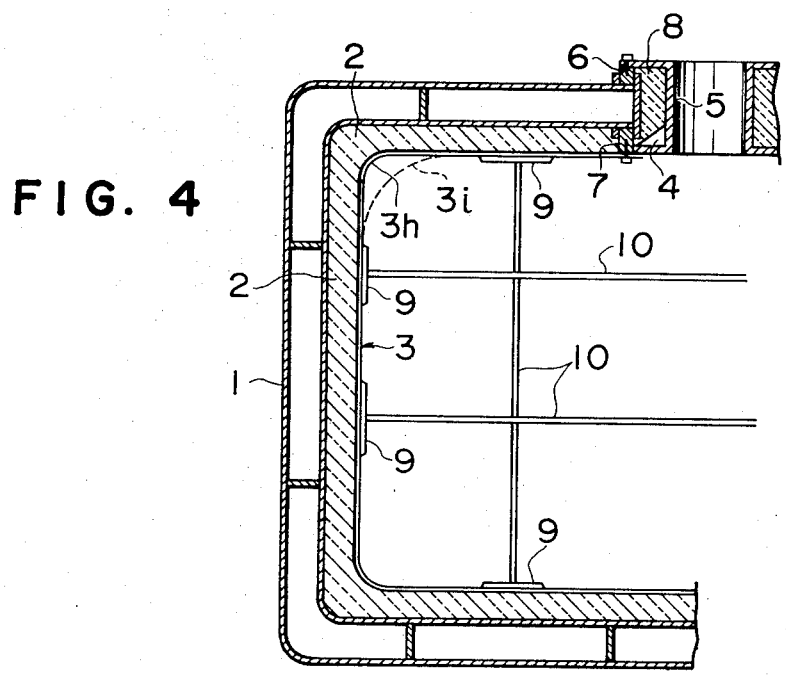
FIG. 4 shows the same section as FIG. 3 but shows the tank in a condition prepared for conducting a hydraulic test according to the second embodiment of this invention.

In FIGS. 3 and 4 the portions corresponding to those shown in FIG. 1 are designated by the same reference numerals as in FIG. 1.

According to the second embodiment of this invention, the inwardly bulged portions 3d, 3e and 3f are pressed by pad plates 9 which are supported by wooden or iron rods 10 working as props between opposite side walls or roof and bottom so that the margins for contraction of the inner membranous vessel incorporated in the inwardly bulged portions are shifted to the edge and/or corner portions 3h where the inner vessel is free from direct contact with the heat insulating layer. By the comparison of FIGS. 3 and 4, it will be appreciated that the inner membranous vessel is deformed to show edge and corner portions of a smaller radius of curvature at such contact free edge and corner portions when the abovementioned shifting of the margins has been effected. In this case, the heat insulating layer must define such steeply curved edge and corners at the corresponding portions that can sufficiently receive the shifting of the margins.

When the inner vessel is loaded with low temperature liquefied gases, the inner vessel contracts to gather toward the fixed portion around the trunk while it is expanded by the internal pressure, and takes the shape to closely contact the inside surface of the heat insulating layer except at the edge and corner portions where the inner membranous vessel is held by suspension by hoop tension and takes a shape such as shown by dotted line 3i in FIG. 4.

After the hydraulic test has been finished, the pad plates and the props are removed to have the inner vessel recover its free shape as shown in FIG. 3.

Figure 5:
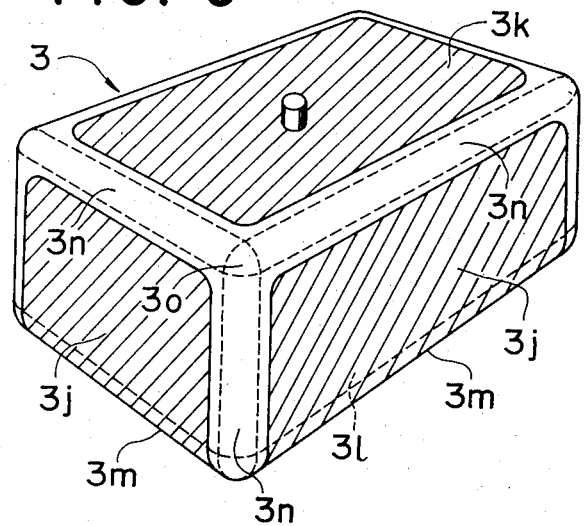
FIG. 5 shows an inner membranous vessel of a low temperature liquefied gas tank of a membrane type, especially the distinction of flat wall and roof portions from edge and corner portions thereof, in a perspective view.

FIG. 5 shows an inner membranous vessel such as the inner membranous vessel 3 in FIG. 3, which is adapted to be directly supported by the inside surface of the heat insulating layer 2 at the hatched portions, i.e., flat side walls 3j, roof 3k and bottom 3l as well as edge portions 3m of the bottom, while at other edge and corner portions 3n and 3o (not hatched), is adapted to be held by suspension by hoop tension under the action of the internal pressure.

When the inner vessel such as shown in FIG. 5, which is also formed as over-sized as compared with the dimensions of the space defined by the inside surface of the heat insulating layer in consideration of contraction thereof at low temperature operating condition, is mounted in said space and is subject to hydraulic test at atmospheric temperature, the aforementioned formation of harmful wrinkling of the inner membranous vessel is avoided, according to a third embodiment of this invention, by that the inner vessel is in the process of being mounted in the tank, supported as flat at the flat portions of the side walls, roof and bottom, while allowing the edge and corner portions thereof to bulge outwardly to absorb the margin for contraction.

Figure 6:
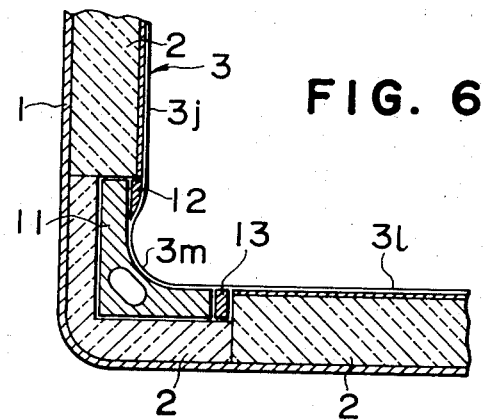
FIG. 6 shows a section of a corner portion of a tank incorporating the vessel shown in FIG. 5 in a condition provisionally constructed for conducting a hydraulic test according to a further embodiment of this invention.

FIG. 6 shows a section of a bottom edge portion of a low temperature liquefied gas tank of the same kind as that shown in FIG. 3, the tank being shown in a provisionally constructed condition for hydraulic test in the manner mentioned above. In FIG. 6, the portions corresponding to those shown in FIG. 3 are designated by the same reference numerals as in FIG. 3. As shown in FIG. 6, the inner membranous vessel 3 is normally supported at the flat wall portion 3j and flat bottom portion 3l by the inside surface of the heat insulating layer 2, while at the edge portion 3m, the inner membranous vessel is allowed to bulge outwardly by an edge block 11 being held at a retracted position. In this provisionally constructed condition, the margin for contraction of the over-sized inner vessel is concentrated to the corner portion 3m, while the flat portions 3j and 3l of the inner vessel are held free of the margin for contraction, and therefore, no wrinkling is formed when water at atmospheric temperature is filled in the inner vessel for hydraulic test. In this case, the edge or corner portions other than those at the edge of the bottom may be held in the manner of suspension by hoop tension, but at the bottom edge portions, the edge portions are properly supported by the retracted edge block 11. In this case, it is also preferable that pads 12 and 13 made of wood or hard rubber are used to provide a smoothly curved supporting surface including the surface of the edge block 11 for the edge portion 3m of the inner vessel.

Figure 7:
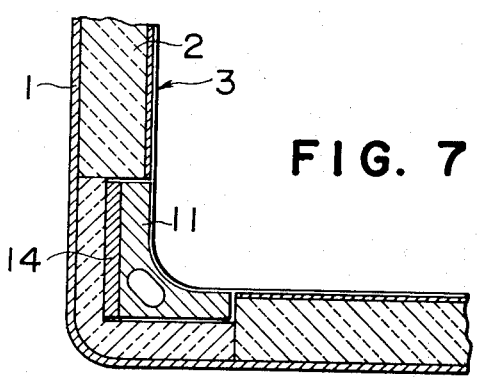
FIG. 7 shows the same section as FIG. 6 but shows the tank in a condition finally constructed for actual operation.

After the hydraulic test has been finished in the provisionally constructed condition as shown in FIG. 6, the edge block 11 is advanced to its normal position as shown in FIG. 7 by removing the pads 12 and 13, and the space left behind the edge block is filled with proper filling material 14.

I claim:

1. A method of hydraulically testing low temperature liquefied gas tanks of a membrane type, said tank comprising liquid outer vessel, a heat insulating intermediate layer and an inner membranous vessel, wherein the said inner membranous vessel is of an angular shape including substantially flat portions and curved edge and corner portions and is adapted to be smoothly supported by the inside surface of the heat insulating intermediate layer under contraction due to low temperature as well as expansion by internal pressure when the inner vessel is loaded with low temperature liquefied gases, though the inner vessel is formed as oversized at atmospheric temperature than a space defined by the inside surface of the heat insulated layer to have a margin for said contraction, characterized by biasing said margin at atmospheric temperature to said curved edge portions so that said flat portions come into close contact with the inside surface of said heat insulating layer, and filling the space in said inner vessel with water at atmospheric temperature.

2. A method according to claim 1, wherein said biasing of the margin is effected by that an edge block adapted to support said edge portion is provisionally retracted from its normal mounting position so as to allow bulging said curved edge portion outwardly as much as to absorb said margin for contraction.

3. A method according to claim 1, wherein said biasing of the margin is effected by the said substantially flat portion is partly pressed by pad plate from the inside of the inner vessel.

* * * * *